United States Patent [19]
Sasaki et al.

[11] Patent Number: 4,619,851
[45] Date of Patent: Oct. 28, 1986

[54] ADHESIVE COMPOSITIONS

[75] Inventors: Yukihiko Sasaki, Claremont; Kenneth S. Lin, Sepulveda; Dianne L. Patterson, Pasadena, all of Calif.

[73] Assignee: Avery International Corporation, Pasadena, Calif.

[21] Appl. No.: 688,695

[22] Filed: Jan. 4, 1985

Related U.S. Application Data

[63] Continuation of Ser. No. 515,698, Jul. 21, 1983, abandoned.

[51] Int. Cl.[4] .............................................. B32B 27/06
[52] U.S. Cl. ...................................... 428/40; 156/250; 156/267; 428/41; 428/352; 428/355; 428/356; 525/92
[58] Field of Search ..................... 428/40, 41, 42, 352, 428/355, 356; 525/92; 156/250, 267

[56] References Cited

U.S. PATENT DOCUMENTS

| | | | |
|---|---|---|---|
| 3,932,328 | 1/1976 | Korpman | 428/355 |
| 3,956,223 | 5/1976 | Chiang et al. | 428/355 |
| 4,028,292 | 6/1977 | Korpman | 525/92 |
| 4,150,183 | 4/1979 | Reed | 428/42 |
| 4,163,077 | 7/1979 | Antonsen et al. | 428/355 |
| 4,246,058 | 1/1981 | Reed | 428/42 |
| 4,379,806 | 4/1983 | Korpman | 428/355 |

*Primary Examiner*—Paul J. Thibodeau
*Attorney, Agent, or Firm*—Christie, Parker & Hale

[57] ABSTRACT

A pressure-sensitive adhesive comprising an at least partially compatible mixture of a thermoplastic rubber and an aliphatic hydrocarbon tackifying system having a softening point of from about 30° to about 80° C. and in which the thermoplstic rubber is present in an amount of from about 15 to about 30 percent by weight, based on the total weight of the thermoplastic rubber and the aliphatic hydrocarbon resin tackifying system, enable high-speed production of matrix-stripped label stock.

39 Claims, 8 Drawing Figures

Fig. 2.
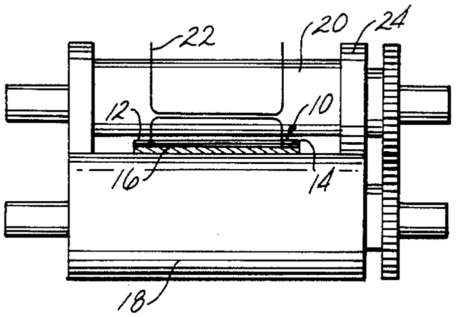
Fig. 3.
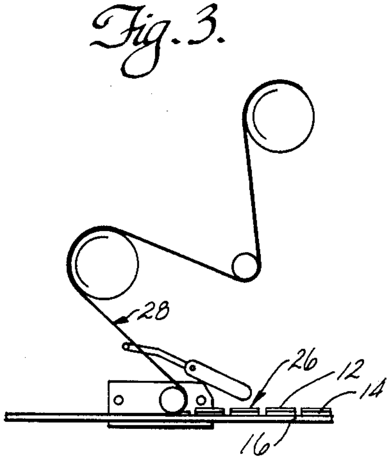
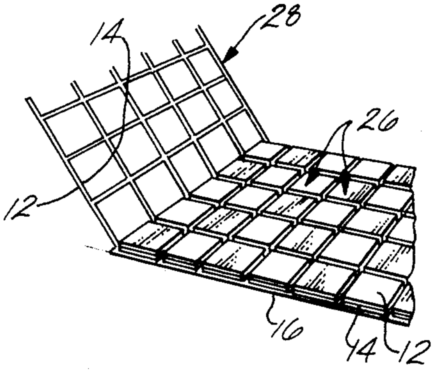
Fig. 4.
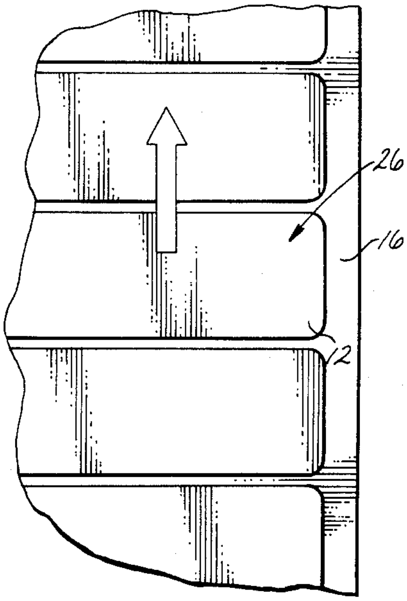
Fig. 5.

ADHESIVE COMPOSITIONS

CROSS REFERENCE TO RELATED APPLICATIONS

This is a continuation of application Ser. No. 06/515,698 filed July 21, 1983, now abandoned.

BACKGROUND OF THE INVENTION

The present invention is directed to general-purpose, pressure-sensitive adhesives which uniquely enhance the rate of conversion of label stock to matrix-stripped label stock.

With reference to attached FIGS. 2, 3 and 4, matrix-stripped label stock is conventionally produced by pressure-sensitive-adhesive label stock 10, comprised of a face material 12, a pressure-sensitive-adhesive layer 14, and a release liner 16, usually silicon-coated, being passed between driven-anvil roll 18 and driven-die roll 20, having cutting edges 22, with penetration of the die into the laminate being determined by breaker 24. Labels 26 are cut to the release liner. There is removed from the laminate a matrix web 28 which, as illustrated in FIG. 4, bears the outline of the labels cut. The cut matrix web, which is waste, is wound for disposal.

Difficulty in removing the matrix web is dependent upon label configuration as well as the adhesive, employed. Conventionally, a label is cut from stock 6½ inches or 15½ inches wide. Some of the more standard dies are Die A, which forms "file folder" labels, illustrated in FIG. 5, and Die B, illustrated in FIG. 6. Labels with longitudinal matrices, such as those illustrated in FIG. 7, or those with many sharp corners or points, such as the "starburst" label illustrated in FIG. 8, are parcularly difficult to die-cut and matrix-strip at high speed.

Presses used for the die-cutting and the matrix-stripping include Webtron, which has an operating speed of up to 650 feet per minute, and the Mark Andy press, which processes stock 15½ inches wide, and which has a an operating speed of up to 1,000 feet per minute.

As previously indicated, although die configurations have limited the rate at which the converter can be operated, the adhesives also play a significant part in this limitation. Many are hot-melt adhesives.

The majority of the commercial hot-melt, pressure-sensitive adhesives used today are based on a thermoplastic rubber, normally a block copolymer such as styrene-isoprene-styrene or styrene-butadiene-styrene, conventionally sold as Kraton® rubbers by Shell Chemical Co. Other major components are tackifying resins, used with or without plasticizing oils. Minor components include antioxidants, fillers and the like. The concentration of thermoplastic rubber present in conventional hot-melt adhesives ranges from about 25 to about 55 percent by weight of the total weight of the composition.

For a given adhesive it has been expected that convertibility will vary with matrix-die complexity. For a given die, as machine speed is increased, the first sign of failure of operation is a phenomenon known as matrix flagging, where the matrix segments normal to the machine direction lift and tear. Generally, this is the highest practical operating speed. Higher speeds can result in the matrix remaining with the face material, due to tearing or the like, and in more aggravated cases, the labels will lift with the matrix because the adhesive has not been properly cut, despite precise configurations of the die to ensure penetration through the adhesive.

Since the die is operated in cooperation with the waste-removal system, the overall system has been limited by the rate at which the waste matrix can be removed.

We have sought to develop an adhesive system which is adaptive to conventional methods of label manufacture by providing overall good adhesive properties but which enables the speed of conversion to be increased.

SUMMARY OF THE INVENTION

It has now been found that the rate of convertibility of matrix-stripped label stock may be substantially improved by the use of adhesives of certain composition.

Accordingly, therefore, in a process where a label stock comprising a face material and a pressure-sensitive-adhesive layer on a release liner is passed through a die and wherein the die penetrates the face material and pressure-sensitive adhesive to the release liner, affording removal of a matrix and leaving behind an array of labels on the release liner, the speed of conversion, or matrix removal, without failure can be substantially increased by using as a pressure-sensitive adhesive an at least partially compatible blend of a thermoplastic rubber, and an aliphatic hydrocarbon tackifying system having a softening point of from about 30° to about 80° C., preferably from about 40° to about 70° C. The tackifying system is preferably formed of a high-softening-point aliphatic hydrocarbon resin and a low-softening-point aliphatic hydrocarbon resin, the combination in all instances forming a pressure-sensitive-adhesive system which, with additives, forms the entire adhesive composition.

The thermoplastic rubber is normally present in a concentration of at least 15 percent by weight, normally from about 15 to about 30 percent by weight, preferably from about 15 to about 25 percent by weight, based on the total weight of the thermoplastic rubber and the balance of the constituents of the pressure-sensitive-adhesive system. The presently preferred thermoplastic rubber is a styrene-isoprene-styrene block copolymer.

A high-softening-point aliphatic hydrocarbon resin is a resin having a softening point of from about 65° to about 110° C., preferably from about 80° to 100° C., and present in a concentration of from about 35 to about 55 percent by weight, more preferably from about 40 to about 50 percent by weight, based on the total weight of the thermoplastic rubber, the high-softening-point aliphatic hydrocarbon resin and the low-softening-point aliphatic hydrocarbon resin (pressure-sensitive-adhesive system).

The low-softening-point aliphatic hydrocarbon resin is one having a softening point of from about −5° to about 30° C., preferably from 0° to 15° C., and present in the amount of from about 15 to about 45 percent by weight, preferably from about 20 to about 45 percent by weight, and more preferably from about 30 to about 40 percent by weight, based on total weight of the thermoplastic rubber, the high-softening-point aliphatic hydrocarbon resin and the low-softening-point aliphatic hydrocarbon resin. There may be employed in the composition a hydrocarbon oil as a substitute for a portion of the low-softening-point aliphatic hydrocarbon resin. The hydrocarbon oil may be present in an amount up to about 25 percent by weight, preferably up to 20 percent by weight, based on the total weight of the pressure-sensitive-adhesive system, with the the proviso that the relative proportions of the components of the pressure-sensitive-adhesive system generally remain the same.

Cost-reducing inorganic fillers, such as calcium carbonate, can be used to improve cohesive strength and reduce the tendency to bleed. Antioxidants and the like may also be present.

THE DRAWINGS

With reference to the attached drawings:

FIG. 2 illustrates a typical converter system which enables cutting of the label stock for matrix removal.

FIGS. 3 and 4, respectively, illustrate schematically and in three-dimension, the stripping of the matrix as waste.

Figure 6:
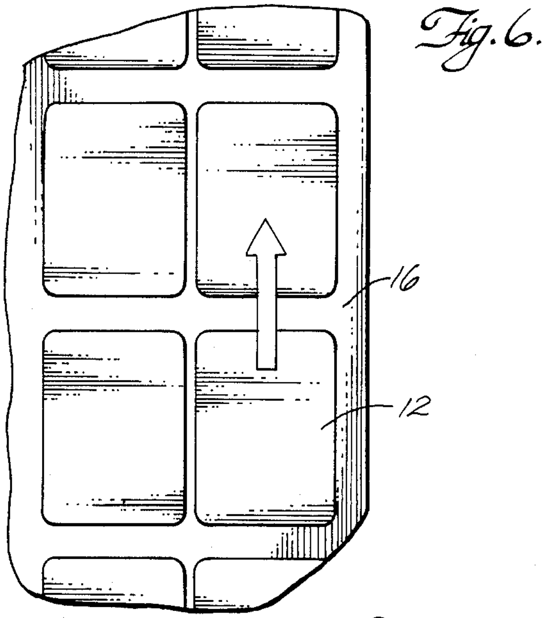
Figure 7:
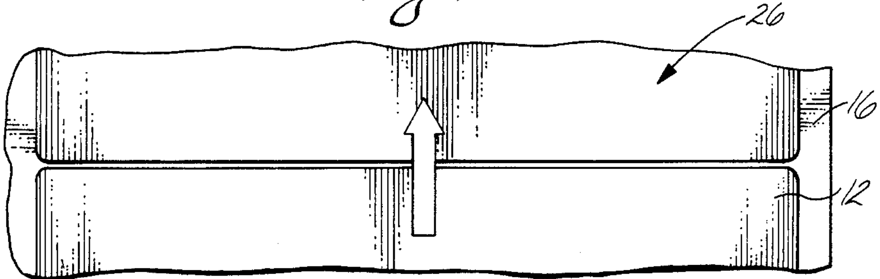
Figure 8:
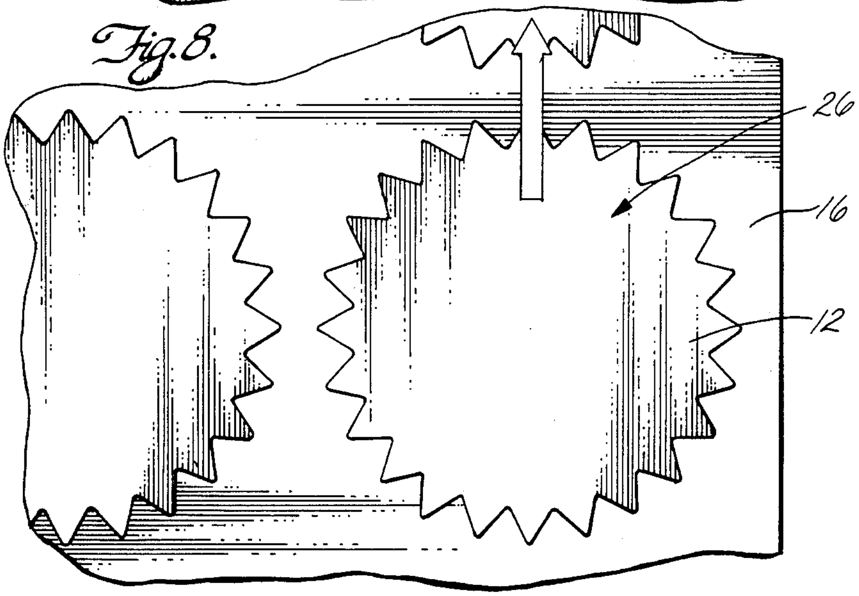

FIGS. 5–8 illustrate different label configurations formed by die-cutting. FIGS. 5 and 6 illustrate labels which are relatively easy to cut. FIGS. 7 and 8 illustrate a 3×5 inch label and "starburst" labels, which are more difficult to cut. As to each of FIGS. 5–8, an arrow shows the machine direction.

DETAILED DESCRIPTION

There are provided herein pressure-sensitive-adhesive compositions utilized in label-stock manufacture and affording high conversion rates in the production of matrix-stripped labels produced therefrom.

The principal components of the composition are an at least partially compatible mixture of a thermoplastic rubber and a tackifying system based on one or more aliphatic hydrocarbon resins having a net softening point (ASTM E-28-67) of from about 30° to about 80° C., preferably from about 40° to about 70° C. The tackifying system is preferably formed of a high-softening-point aliphatic hydrocarbon resin and a low-softening-point aliphatic hydrocarbon resin. Presently preferred thermoplastic rubbers comprise styrene-isoprene-styrene block copolymers, such as Kraton® 1107 or 1112, manufactured and sold by Shell Chemical Co. Styrene-butadiene-styrene block copolymers may also be used alone or in combination with styrene-isoprene-styrene block copolymers. The thermoplastic rubber may be present in a concentration of at least 15 percent by weight, normally from about 15 percent by weight to about 30 percent by weight, based on the total weight of the thermoplastic rubber, the high-softening-point aliphatic hydrocarbon resin and the low-softening-point aliphatic hydrocarbon resin (pressure-sensitive adhesive system). A preferred range is from about 15 to about 25 percent by weight.

A "high-softening-point aliphatic hydrocarbon resin" as used herein is one having a softening point of from about 65° to about 110° C., preferably from about 80° to about 100° C., more preferably about 90° C., as determined by ASTM E-28-67 ring-and-ball method. Illustrave high-softening-point aliphatic hydrocarbons include Escorez® 1310, manufactured and sold by Exxon, having a softening point of from about 93° to about 95° C.; Wingtack® 95, manufactured and sold by Goodyear and having a softening point of from about 90° to about 95° C.; Piccotac 95, manufactured and sold by Hercules Inc. and having a softening point of about 95° C.; and the like.

By a "low-softening-point aliphatic hydrocarbon" there is meant a hydrocarbon resin having a softening point of from about −5° to about 30° C., preferably from about 0° to about 15° C., and most preferably 10° C. Illustrative resins include Wingtack® 10, having a softening point of 10° C., Adtac® B-10, manufactured by Hercules Inc., having a softening point of about 10° C., and the like.

By the term, "aliphatic hydrocarbon resin", there is meant a resin which is predominantly aliphatic in nature, although up to about 35 percent by weight of the resin may be aromatic in nature. It is presently preferred that the resin be non-aromatic.

The high-softening-point aliphatic hydrocarbon resin may be present in a concentration of from about 35 to about 55 percent by weight, based on the total weight of the pressure-sensitive-adhesive system, preferably from about 35 to about 55 percent by weight, more preferably from about 40 to about 50 percent by weight.

The low-softening-point aliphatic hydrocarbon resin may be present in a concentration of from about 15 to about 45 percent by weight, preferably from about 20 to about 45 percent by weight, more preferably from about 30 to about 40 percent by weight, based on the total weight of the pressure-sensitive-adhesive system.

A hydrocarbon oil may be added to reduce cost, by replacing a portion of the low-softening-point resin in amounts of up to about 25 percent by weight, based on the total weight of the pressure-sensitive-adhesive system, preferably up to about 20 percent by weight.

There may also be included up to 25 percent by weight of the total composition, additives, including fillers. Any inorganic fillers are present in an amount of up to 20 percent by weight of the total composition, and include calcium carbonate, talc and the like. Inorganic fillers improve cohesive strength and reduce bleed. Other additives include antioxidants, dyes and the like, but are normally present in minor amounts.

The pressure-sensitive-adhesive composition of the instant invention may be applied to paper stock as a hot-melt or from a solvent system, although hot-melt application is preferred.

Conversion, other factors being the same, is unexpectedly uniformly high.

In addition to affording high conversion rates, the pressure-sensitive adhesives of the instant invention are of extremely low cost, since the thermoplastic rubber, which is normally the highest cost component, is of low concentration, relative to conventional adhesives. They also provide improved adhesion to various substrates, including cardboard, polyethylene, stainless steel and the like; ease of processability, i.e., compounding and coating; and, due to low viscosity, afford a high degree of formulation latitude.

Figure 1:
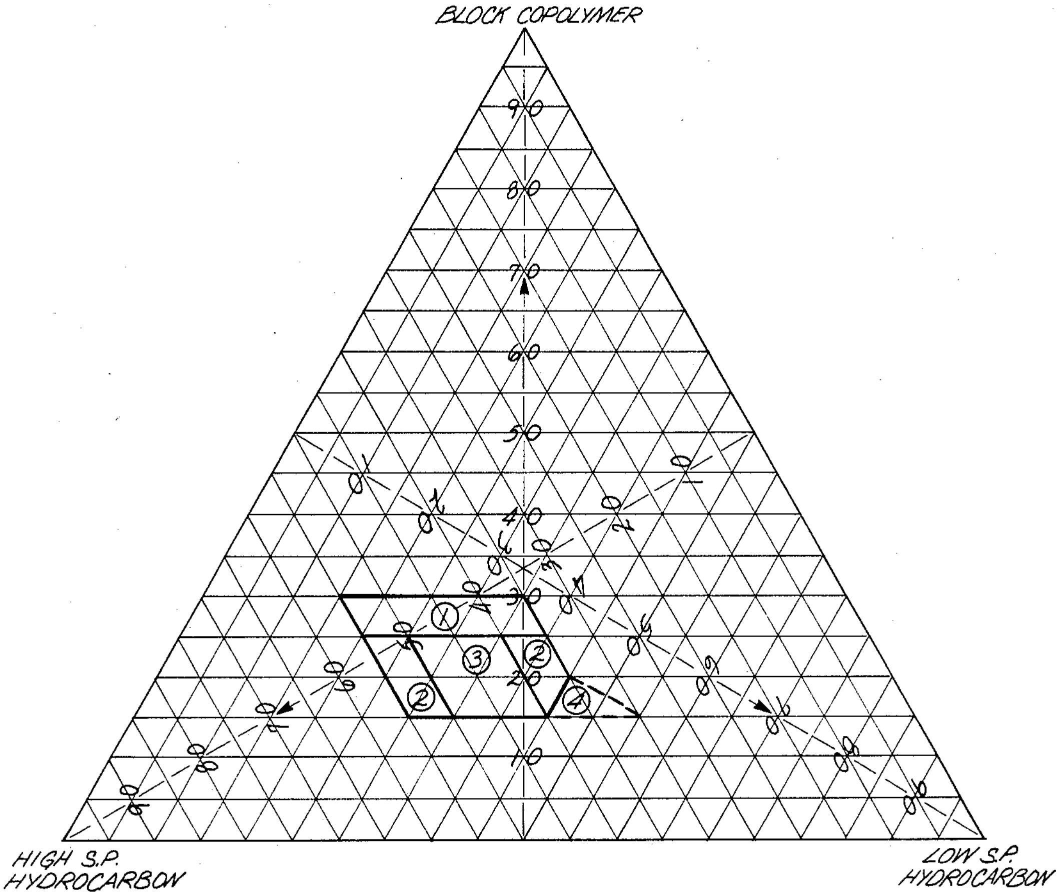
FIG. 1 is a ternary diagram illustrating the regions of useful adhesive compositions for high-speed matrix-stripped label production.

With reference to FIG. 1, the regions of utile compositions for high-speed conversion are shown. The broadest utile region includes segments 1, 2, 3 and 4. Segment 4 has unacceptable aged-bleed characteristics, namely, the tendency of the component of the pressure-sensitive adhesive to stain the face stock or release liner, but is useful where bleed is unimportant, such as in foil labels. This increases the range of low-softening-point hydrocarbon to about 55 percent by weight of the resin for such application. A preferred range is the region denoted by segments 1, 2 and 3; a more preferred composition is denoted by segments 2 and 3; while segment 3 is most preferred.

The currently preferred pressure-sensitive-adhesive system comprises about 20 percent by weight block copolymer, based on styrene and isoprene, about 45 percent by weight aliphatic hydrocarbon tackifying resin having a softening point of about 95° C., and about 35 percent by weight of an aliphatic hydrocarbon tackifying resin having a softening point of about 10° C., with a portion of the latter resin being replaceable with up to 10 parts by weight hydrocarbon oil.

Without limiting, the following Examples illustrate the improvements afforded by use of the instant invention.

EXAMPLES 1 TO 5

Table I shows formulations of hot-melt pressure-sensitive adhesives in parts-by-weight for use in the practice of this invention.

TABLE I

| | Ex. 1 | Ex. 2 | Ex. 3 | Ex. 4 | Ex. 5 |
|---|---|---|---|---|---|
| Block Copolymer[a] | | | | | |
| KRATON ® 1112 | 20 | 20 | — | — | — |
| KRATON ® 1107 | — | — | 20 | 20 | 20 |
| High SP Hydrocarbon | | | | | |
| ESCOREZ ® 1310[b] | 45 | 45 | 45 | 45 | 45 |
| Low SP Hydrocarbon | | | | | |
| ADTAC ® B-10[c] | 35 | 25 | 25 | 25 | 35 |
| Hydrocarbon Oil | | | | | |
| SHELLFLEX ® 371[d] | — | 10 | 10 | 10 | — |
| Additives | | | | | |
| VICRON ® 15-15[e] | — | — | — | 5 | — |
| ETHYL ® 330[f] | 0.8 | 0.8 | 0.8 | 0.8 | 0.8 |
| LTDP ®[g] | 0.8 | 0.8 | 0.8 | 0.8 | 0.8 |

[a] A mix of styrene-isoprene-styrene and styrene-isoprene block copolymers, manufactured and sold by Shell Chemical Company, having a styrene-isoprene ratio of 14:30, but ranging in SIS-to-SI ratio, with Kraton 1107 having the highest ratio.
[b] An aliphatic hydrocarbon, manufactured and sold by Exxon Corporation, having a softening point of 93°-95° C., as measured by ASTM E28-67.
[c] An aliphatic hydrocarbon, sold by Hercules Inc., having a softening point of about 10° C.
[d] A naphtha-cut hydrocarbon oil manufactured and sold by Shell Chemical Co.
[e] Calcium carbonate.
[f] An antioxidant manufactured and sold by Ethyl Corp.
[g] An antioxidant manufactured and sold by Cyanamid.

In the following summation of adhesive properties in Table II, peel is determined by Pressure Sensitive Tape Council Test #2, as published in the 5th Edition (PSTC 2-5th), and Shear by Test 7 (PSTC 7-5th). The following codes are employed:

PT=Paper Tear
IPT=Immediate Paper Tear

Adhesive Properties of Examples 1, 3, and 5

COATING WT: 20.5 g/m$^2$
FACESTOCK: 60-lb. Glossy, Bleached Paper
LINER: Silicon-Release-Coated Kraft Paper

TABLE II

| | Ex. 1 | Ex. 3 | Ex. 5 |
|---|---|---|---|
| 90° Peel (N/25 mm) Polyethylene | 14.2 | 11.2 | PT |
| 90° Peel (N/25 mm) Stainless Steel | IPT | 11.4 | IPT |
| 90° Peel (N/25 mm) Corrugated Board | 7.9 | 4.9 | 7.8 |
| Shear (hr) (500 g ¼ in$^2$) | 0.4 | 0.5 | 0.6 |
| Aged-Bleed | Acceptable | Acceptable | Acceptable |

CONVERTIBILITY

The following Table compares the convertibility performance for various die configurations in feet-per-minute (fpm) for the pressure-sensitive adhesive of Example 5 to the standard adhesive of the Control. The machine was a Webtron, processing a 6½" stock. The Control was identical to the construction of Example 5, except that the pressure-sensitive adhesive was a commercially-available hot-melt adhesive containing from about 30 to 35 percent by weight thermoplastic rubber, the balance of the pressure-sensitive adhesive being a mixture of polyterpene-type tackifiers and a hydrocarbon oil present in an amount of less than about 10 percent by weight of the pressure-sensitive-adhesive system.

TABLE III

| Die for Product of | Example 5 | Control |
|---|---|---|
| FIG. 5 | Top Speed[1] | 350–450 fpm |
| FIG. 6 | " | Top Speed |
| FIG. 7 | " | 100–200 fpm |
| FIG. 8 | " | 0–100 fpm |

[1] about 650 fpm

A 15½" stock was processed on a Mark Andy Press having an operating speed of up to 1000 fpm. The die was one to cut labels measuring 3" in the machine direction and 3½" normal to the machine direction. Matrix width was ⅛" in the machine direction and 1/16" normal thereto. The adhesive of Example 5 enabled trouble-free conversion at 900 fpm, with slight flagging at 1000 fpm. The adhesive of the Control limited machine speed to from 100 to 300 fpm.

What is claimed is:

1. In a process for the production of matrix-stripped labels in which a label-stock laminate comprised of a face material, a pressure-sensitive-adhesive layer in contact with the release surface of a release liner die-cut by a die-cutting system which forms an array of labels by die-cutting through the face material and the pressure-sensitive adhesive to the release liner, followed by removal of a matrix of face material and pressure-sensitive adhesive leaving an array of labels on the release liner, the improvement which enables increased speed of production of matrix-stripped labels which comprises using as the pressure-sensitive adhesive in contact with the release liner a pressure-sensitive-adhesive system comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 40 percent by weight, based on the weight of the pressure-sensitive-adhesive system, said high-softening-point aliphatic hydrocarbon tackifying resin having a softening point of from about 65° to about 110° C. and present in a concentration of from about 35 to about 55 percent by weight, based on the weight of the pressure-sensitive-adhesive system.

2. A process as claimed in claim 1 in which the aliphatic hydrocarbon tackifying resin system has a softening point of from about 40° to about 70° C.

3. A process as claimed in claim 2 in which the thermoplastic rubber is percent in an amount of from about 15 to about 25 percent by weight, based on the total weight of the thermoplastic rubber and the aliphatic hydrocarbon resin tackifying system.

4. A process as claimed in claim 3 in which the thermoplastic rubber comprises a styrene-isoprene-styrene block copolymer.

5. In a process for the production of matrix-stripped labels in which a label-stock laminate comprised of a face material, a pressure-sensitive-adhesive layer in contact with the release surface of a release liner, a die-cutting system which forms an array of labels by die-cutting through the face material and the pressure-sensitive adhesive, followed by removal of a matrix of face material and pressure-sensitive adhesive leaving an array of labels on the release liner, the improvement which enables increased speed of production of matrix-stripped labels which comprises using as the pressure-sensitive adhesive in contact with the release liner a pressure-sensitive adhesive comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 45 percent by weight, based on the weight of the pressure-sensitive-adhesive system, said high-softening-point aliphatic hydrocarbon tackifying resin having a softening point of from about 65° to about 110° C. and present in a concentration of from about 35 to about 55 percent by weight, based on the weight of the pressure-sensitive-adhesive system.

6. A process as claimed in claim 5 in which the thermoplastic rubber is present in an amount of from about 15 to about 25 percent by weight, based on the weight of the pressure-sensitive-adhesive system.

7. A process as claimed in claim 5 in which the low-softening-point aliphatic hydrocarbon tackifying resin has a softening point of from about 0° to about 15° C. and is present in an amount of from about 30 to about 40 percent by weight, based on the weight of the pressure-sensitive-adhesive system, and in which the high-softening-point aliphatic hydrocarbon tackifying resin has a softening point of from about 80° to about 100° C.

8. A process as claimed in claim 6 in which the low-softening-point aliphatic hydrocarbon tackifying resin has a softening point of from about 0° to about 15° C. and is present in an amount of from about 30 to about 40 percent by weight, based on the weight of the pressure-sensitive-adhesive system, and in which the high-softening-point aliphatic hydrocarbon tackifying resin has a softening point of from about 80° to about 100° C.

9. A process as claimed in claim 8 in which the thermoplastic rubber comprises a styrene-isoprene-styrene block copolymer.

10. In a process for the production of matrix-stripped labels in which a label-stock laminate comprised of a face material, a pressure-sensitive-adhesive layer in contact with the release surface of a release liner, a die-cutting system which forms an array of labels by die-cutting through the face material and the pressure-sensitive adhesive, followed by removal of a matrix of face material and pressure-sensitive adhesive leaving an array of labels on the release liner, the improvement which enables increased speed of production of matrix-stripped labels which comprises using as the pressure-sensitive adhesive in contact with the release liner a pressure-sensitive adhesive comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 25 percent by weight, based on the weight of the pressure-sensitive-adhesive system, said low-softening-point aliphatic hydrocarbon tackifying resin having a softening point of from about 0° to about 15° C. and present in an amount of from about 30 to about 40 percent by weight, based on the weight of the pressure-sensitive-adhesive system, said high-softening-point aliphatic hydrocarbon tackifying resin having a softening point of from about 80° to about 100° C. and present in a concentration of from about 40 to about 50 percent by weight, based on the weight of the pressure-sensitive-adhesive system.

11. A process as claimed in claim 10 in which the thermoplastic rubber comprises a styrene-isoprene-styrene block copolymer.

12. A label-stock laminate comprising a face material, a pressure-sensitive-adhesive layer in contact with the release surface of a release liner, said pressure-sensitive-adhesive layer formed of a pressure-sensitive-adhesive system comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 40 percent by weight, based on the weight of the pressure-sensitive-adhesive system, said high-softening-point aliphatic hydrocarbon tackifying resin having a softening point of from about 65° to about 110° C. and present in a concentration of from about 35 to about 55 percent by weight, based on the weight of the pressure-sensitive-adhesive system.

13. A laminate as claimed in claim 12 in which the aliphatic hydrocarbon tackifying resin system has a softening point of from about 40° to about 70° C.

14. A laminate as claimed in claim 12 in which the thermoplastic rubber is present in an amount of from about 15 to about 20 percent by weight, based on the total weight of the thermoplastic rubber and the aliphatic hydrocarbon resin tackifying system.

15. A laminate as claimed in claim 14 in which the thermoplastic rubber comprises a styrene-isoprene-styrene block copolymer.

16. A label-stock laminate comprising a face material and a pressure-sensitive-adhesive layer in contact with the release surface of a release liner, said pressure-sensitive adhesive comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 40 percent by weight, based on the weight of the pressure-sensitive-adhesive system, said high-softening-point aliphatic hydrocarbon tackifying resin having a softening point of from about 85° to about 110° C. and present in a concentration of from about 35 to about 55 percent by weight, based on the weight of the pressure-sensitive-adhesive system.

17. A laminate as claimed in claim 16 in which the low-softening-point aliphatic hydrocarbon tackifying resin has a softening point of from about 0° to about 15° C. and is present in an amount of from about 30 to about 40 percent by weight, based on the weight of the pressure-sensitive-adhesive system, and in which the high-softening-point aliphatic hydrocarbon tackifying resin has a softening point of from about 80° to about 100° C.

18. A laminate as claimed in claim 17 in which the thermoplastic rubber comprises a styrene-isoprene-styrene block copolymer.

19. A label-stock laminate comprising a face material and a pressure-sensitive-adhesive layer in contact with the release surface of a release liner, said pressure-sensitive adhesive comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 25 percent by weight, based on the weight of the pressure-sensitive-adhesive system, said low-softening-point aliphatic hydrocarbon tackifying resin having a softening point of from about 0° to about 15° C. and present in an amount of from about 30 to about 40 percent by weight, based on the weight of the pressure-sensitive-adhesive system, said high-softening-point aliphatic hydrocarbon tackifying resin having a softening point of from about 80° to about 100° C. and present in a concentration of from about 40 to about 50 percent by weight, based on the weight of the pressure-sensitive-adhesive system.

20. A laminate as claimed in claim 19 in which the thermoplastic rubber is present in an amount of from about 15 to about 25 percent by weight, based on the weight of the pressure-sensitive-adhesive system.

21. Matrix-stripped label stock comprising a plurality of matrix-stripped labels formed of a face material and a pressure-sensitive-adhesive layer in which the pressure-sensitive-adhesive layer is in contact with the release surface of a release liner for the plurality of matrix-stripped labels and in which the pressure-sensitive-adhesive layer in contact with the release liner is a pressure-sensitive-adhesive system comprising an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 40 percent by weight, based on the weight of the pressure-sensitive-adhesive system, said high-softening point aliphatic hydrocarbon tackifying resin having a softening point of from about 65° to about 110° C. and present in a concentration of from about 35 to about 55 percent by weight, based on the weight of the pressure-sensitive-adhesive system.

22. Matrix-stripped label stock as claimed in claim 21 in which the aliphatic hydrocarbon tackifying resin system has a softening point of from about 40° to about 70° C.

23. Matrix-stripped label stock as claimed in claim 22 in which the thermoplastic rubber is present in an amount of from about 15 to about 20 percent by weight, based on the total weight of the thermoplastic rubber and the aliphatic hydrocarbon resin tackifying system.

24. Matrix-stripped label stock as claimed in claim 23 in which the thermoplastic rubber comprises a styrene-isoprene-styrene block copolymer.

25. Matrix-stripped label stock comprising a plurality of matrix-stripped labels formed of a face material and a pressure-sensitive adhesive in which the pressure-sensitive adhesive layer is in contact with the release surface of a release liner for the plurality of matrix-stripped labels and in which the pressure-sensitive adhesive in contact with the release liner comprises an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 25 percent by weight, based on the weight of the pressure-sensitive-adhesive system, said low-softening-point aliphatic hydrocarbon tackifying resin having a softening point of from about −5° to about 30° C. and present in an amount of from about 30 to about 40 percent by weight, based on the weight of the pressure-sensitive-adhesive system, said high-softening-point aliphatic hydrocarbon tackifying resin having a softening point of from about 80° to about 100° C. and present in a concentration of from about 40 to about 50 percent by weight, based on the weight of the pressure-sensitive-adhesive system.

26. Matrix-stripped label stock as claimed in claim 25 in which the thermoplastic rubber is present in an amount of from about 15 to about 25 percent by weight, based on the weight of the pressure-sensitive-adhesive system.

27. Matrix-stripped label stock as claimed in claim 25 in which the low-softening-point aliphatic hydrocarbon tackifying resin has a softening point of from about 0° to about 15° C. and is present in an amount of from about 30 to about 40 percent by weight, based on the weight of the pressure-sensitive-adhesive system, and in which the high-softening-point aliphatic hydrocarbon tackifying resin has a softening point of from about 80° to about 100° C.

28. Matrix-stripped label stock as claimed in claim 26 in which the low-softening-point aliphatic hydrocarbon tackifying resin has a softening point of from about 0° to about 15° C. and is present in an amount of from about 30 to about 40 percent by weight, based on the weight of the pressure-sensitive-adhesive system, and in which the high-softening-point aliphatic hydrocarbon tackifying resin has a softening point of from about 80° to about 100° C.

29. Matrix-stripped label stock as claimed in claim 28 in which the thermoplastic rubber comprises a styrene-isoprene-styrene block copolymer.

30. Matrix-stripped label stock comprising a plurality of matrix-stripped labels formed of a face material and a pressure-sensitive adhesive in which the pressure-sensitive adhesive layer is in contact with the release surface of a release liner for the plurality of matrix-stripped labels and in which the pressure-sensitive adhesive in contact with the release liner comprises an at least partially compatible mixture of a thermoplastic rubber, a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 25 percent by weight, based on the weight of the pressure-sensitive-adhesive system, said low-softening-point aliphatic hydrocarbon tackifying resin having a softening point of from about 0° to about 15° C. and present in an amount of from about 30 to about 40 percent by weight, based on the weight of the pressure-sensitive-adhesive system, said high-softening-point aliphatic hydrocarbon tackifying resin having a softening point of from about 80° to about 100° C. and present in a concentration of from about 40 to about 50 percent by weight, based on the weight of the pressure-sensitive-adhesive system.

31. Matrix-stripped label stock as claimed in claim 30 in which the thermoplastic rubber comprises a isoprene-styrene block copolymer.

32. A pressure-sensitive-adhesive system comprising an at least partially compatible mixture of a thermoplastic rubber and an aliphatic hydrocarbon tackifying system having a softening point of from about 30° to about 80° C. and in which the thermoplastic rubber is present in an amount of from about 15 to about 30 percent by weight, based on the total weight of the pressure-sensitive-adhesive system, the aliphatic hydrocarbon resin tackifying system comprising a low-softening-point aliphatic hydrocarbon tackifying resin and a high-softening-point aliphatic hydrocarbon tackifying resin forming a pressure-sensitive-adhesive system, said thermoplastic rubber present in an amount of from about 15 to about 30 percent by weight, based on the weight of the pressure-sensitive-adhesive system, said low-softening-point aliphatic hydrocarbon tackifying resin having a softening point of from about −5° to about 30° C. and present in an amount of from about 15 to about 40 percent by weight, based on the weight of the pressure-sensitive-adhesive system, said high-softening-point aliphatic hydrocarbon tackifying resin having a softening point of from about 65° to about 110° C. and present in a concentration of from about 35 to about 55 percent by weight, based on the weight of the pressure-sensitive-adhesive system.

33. A pressure-sensitive adhesive as claimed in claim 32 in which the aliphatic hydrocarbon tackifying resin system has a softening point of from about 40° to about 70° C.

34. A pressure-sensitive adhesive as claimed in claim 32 in which the thermoplastic rubber is present in an amount of from about 15 to about 20 percent by weight, based on the total weight of the thermoplastic rubber and the aliphatic hydrocarbon resin tackifying system.

35. A pressure-sensitive adhesive as claimed in claim 32 in which the thermoplastic rubber comprises a styrene-isoprene-styrene block copolymer.

36. A pressure-sensitive adhesive comprising an at least partially compatible mixture of a thermoplastic rubber, a low-softening-point aliphatic hydrocarbon tackifying resin and a high-softening-point aliphatic hydrocarbon tackifying resin forming a pressure-sensitive adhesive system, said thermoplastic rubber present in an amount of from about 15 to about 25 percent by weight, based on the weight of the pressure-sensitive-adhesive system, said low-softening-point aliphatic hydrocarbon tackifying resin having a softening point of from about 0° to about 15° C. and present in an amount of from about 30 to about 40 percent by weight, based on the weight of the pressure-sensitive-adhesive system, said high-softening-point aliphatic hydrocarbon tackifying resin having a softening point of from about 80° to about 100° C. and present in a concentration of from about 40 to about 50 percent by weight, based on the weight of the pressure-sensitive-adhesive system.

37. A pressure-sensitive adhesive as claimed in claim 36 in which the thermoplastic rubber comprises a styrene-isoprene-styrene block copolymer.

38. A pressure-sensitive adhesive as claimed in claim 36 which a hydrocarbon oil is present in an amount of up to about 25 percent by weight, based on the total weight of the pressure-sensitive-adhesive system, as replacement of a portion of the low-softening-point aliphatic hydrocarbon tackifying resin.

39. A pressure-sensitive adhesive as claimed in claim 36 in which an inorganic filler is present in an amount of up to about 20 percent by weight, based on the total weight of the pressure-sensitive-adhesive system and the inorganic filler.

* * * * *

UNITED STATES PATENT AND TRADEMARK OFFICE
CERTIFICATE OF CORRECTION

PATENT NO. : 4,619,851

Page 1 of 2

DATED : OCTOBER 28, 1986

INVENTOR(S) : YUKIHIKO SASAKI, KENNETH S. LIN, DIANNE L. PATTERSON

It is certified that error appears in the above-identified patent and that said Letters Patent is hereby corrected as shown below:

IN THE ABSTRACT ITEM (57)

| | |
|---|---|
| Line 5 | Change "thermoplstic" to -- thermoplastic -- |

IN THE SPECIFICATION

| | |
|---|---|
| Column 1, line 36 | Change "parcularly" to -- particularly -- |
| Column 1, line 42 | Before "an operating" delete "a" |
| Column 3, lines 57,58 | Change "Illustrave" to -- Illustrative -- |
| Column 6, line 26 | After "speed" delete "to" |

UNITED STATES PATENT AND TRADEMARK OFFICE
CERTIFICATE OF CORRECTION

PATENT NO. : 4,619,851

DATED : OCTOBER 28, 1986

INVENTOR(S) : YUKIHIKO SASAKI, KENNETH S. LIN, DIANNE L. PATTERSON

It is certified that error appears in the above-identified patent and that said Letters Patent is hereby corrected as shown below:

IN THE CLAIMS

| | |
|---|---|
| Column 8, line 67 | Change "-5°" to -- 0° -- |
| Column 11, lines 21, 22 | Change "isoprene-styrene" to -- styrene-isoprene-styrene -- |
| Column 12, line 37 | After "36" and before "which" insert -- in -- |

Signed and Sealed this

Seventh Day of June, 1988

*Attest:*

DONALD J. QUIGG

*Attesting Officer*

*Commissioner of Patents and Trademarks*